United States Patent
Weidemann et al.

(10) Patent No.: US 10,464,417 B2
(45) Date of Patent: Nov. 5, 2019

(54) METHOD FOR OPERATING A MULTI-AXLE DRIVE DEVICE AND CORRESPONDING MULTI-AXLE DRIVE DEVICE

(71) Applicant: AUDI AG, Ingolstadt (DE)

(72) Inventors: Dieter Weidemann, Stammham (DE);
Heiko Hanickel, Kipfenberg (DE);
Florian Kolb, Gößweinstein (DE);
Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 15/522,018

(22) PCT Filed: Oct. 29, 2015

(86) PCT No.: PCT/EP2015/075066
§ 371 (c)(1),
(2) Date: Apr. 26, 2017

(87) PCT Pub. No.: WO2016/066731
PCT Pub. Date: May 6, 2016

(65) Prior Publication Data
US 2017/0313186 A1    Nov. 2, 2017

(30) Foreign Application Priority Data

Oct. 29, 2014 (DE) .................. 10 2014 016 078

(51) Int. Cl.
*B60K 23/08* (2006.01)
*B60K 17/344* (2006.01)
*F16D 21/02* (2006.01)

(52) U.S. Cl.
CPC ............ *B60K 23/08* (2013.01); *B60K 17/344* (2013.01); *B60K 2023/0858* (2013.01);
(Continued)

(58) Field of Classification Search
CPC .... B60Y 2300/18175; B60Y 2300/423; B60K 2023/085; B60K 2023/0866; B60K 2023/0875; B60K 2023/0858
See application file for complete search history.

(56) References Cited

U.S. PATENT DOCUMENTS

2010/0094519 A1* 4/2010 Quehenberger ....... B60K 17/35
701/69
2012/0095659 A1* 4/2012 Rodrigues .............. B60K 23/08
701/69
(Continued)

FOREIGN PATENT DOCUMENTS

CN    103619631 A    3/2014
CN    103660932 A    3/2014
(Continued)

OTHER PUBLICATIONS

Translation of the International Preliminary Report on Patentability dated May 11, 2017, in connection with corresponding international Application No. PCT/EP2015/075066 (8 pgs.).
(Continued)

Primary Examiner — Timothy Hannon
(74) Attorney, Agent, or Firm — Maier & Maier, PLLC

(57) ABSTRACT

A multi-axle drive device and method for operating a multi-axle drive device. The multi-axle drive device is provided with a synchronization clutch present in an operational connection between a first output shaft and a connecting shaft and at least one disconnecting clutch present in an operational connection between the connecting shaft and a second output shaft. The synchronization clutch and the disconnecting clutch are opened in a first operating state and closed in a second operating state. At the same time, with an intended change from the second operating state to the first operating state, the synchronization clutch is maintained at least partially opened and the separation clutch is maintained
(Continued)

closed, so that, when a first operating mode is carried out, the disconnecting clutch is opened, and when a second operating mode is carried out, the synchronization clutch is closed again.

14 Claims, 1 Drawing Sheet

(52) U.S. Cl.
CPC ..... *B60Y 2300/18175* (2013.01); *F16D 21/02* (2013.01); *F16D 2500/30428* (2013.01); *F16D 2500/3118* (2013.01); *F16D 2500/5075* (2013.01)

(56) References Cited

U.S. PATENT DOCUMENTS

| | | |
|---|---|---|
| 2013/0220722 A1 | 8/2013 | Mita |
| 2014/0136062 A1 | 5/2014 | Mita |
| 2015/0019094 A1* | 1/2015 | Larkin ................. B60K 23/08 |
| | | 701/65 |
| 2015/0096814 A1* | 4/2015 | Maeda ................. B62D 11/003 |
| | | 180/6.28 |
| 2015/0096821 A1* | 4/2015 | Arai ...................... B60K 17/02 |
| | | 180/233 |
| 2016/0355089 A1* | 12/2016 | Ogawa ................. B60K 23/08 |

FOREIGN PATENT DOCUMENTS

| | | |
|---|---|---|
| CN | 103813924 A | 5/2014 |
| CN | 103818244 A | 5/2014 |
| DE | 10120221 A1 | 1/2003 |
| DE | 102009005378 A1 | 4/2010 |
| DE | 102011084220 A1 | 4/2012 |
| WO | 2014/166819 A2 | 10/2014 |

OTHER PUBLICATIONS

International Search Report dated Feb. 17, 2016 of corresponding application No. PCT/EP2015/075066; 12 pgs.
Chinese Office Action dated Sep. 21, 2018, in connection with corresponding CN Application No. 201580058691.3 (20 pgs., including English translation).
Office Action dated Jun. 4, 2019, in corresponding Chinese Application No. 201580058691.3, 8 pages.

* cited by examiner

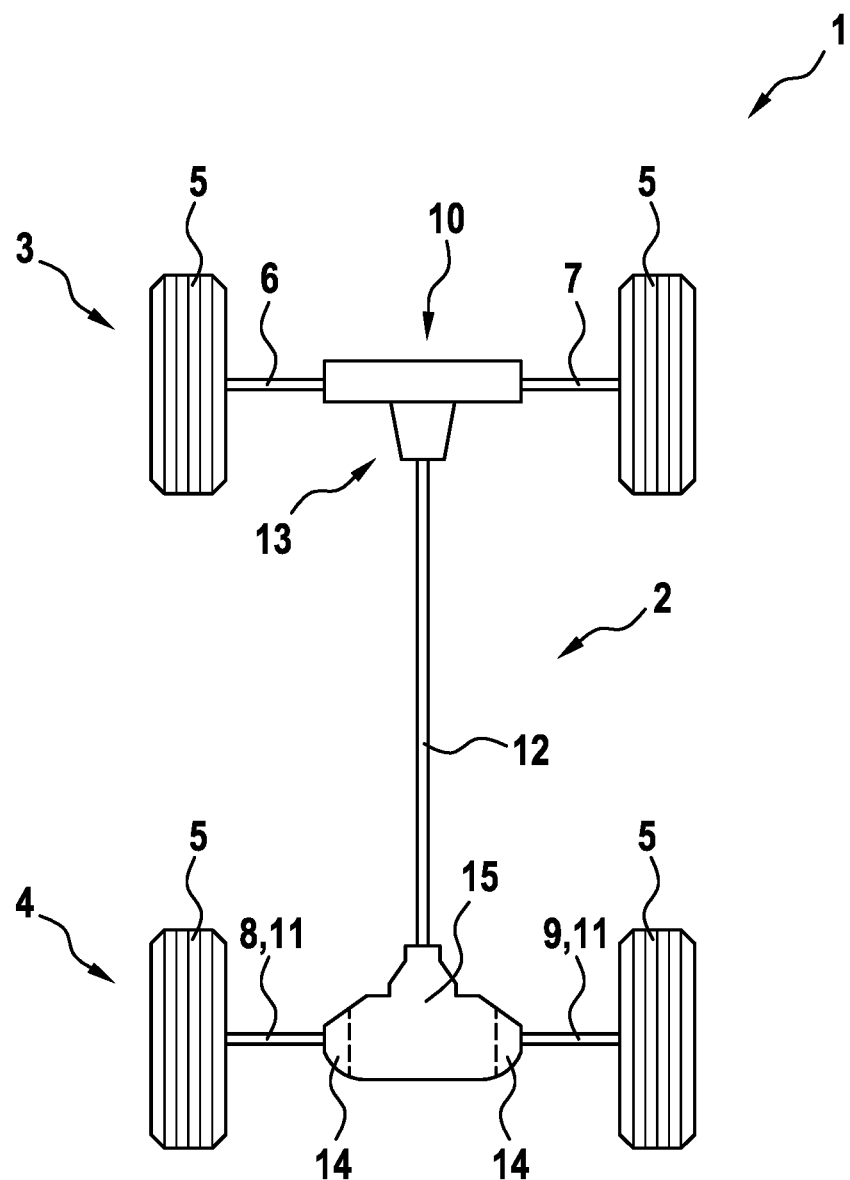

METHOD FOR OPERATING A MULTI-AXLE DRIVE DEVICE AND CORRESPONDING MULTI-AXLE DRIVE DEVICE

BACKGROUND

The invention relates to a method for operating a multi-shaft device, wherein the multi-axle drive device is provided with a synchronization clutch that is present in an operational connection between a first output shaft and a connecting shaft and at least one disconnecting clutch present in an operational connection between the connecting shaft and a second output shaft, and wherein the synchronization clutch as well as the disconnecting clutch are opened in a first operating state and closed in a second operating state. The invention further relates to a multi-axle drive device.

The multi-axle drive device can be used for example for a motor vehicle and in particular, it can be a component of the motor vehicle. The multi-axle drive makes it possible to drive a plurality of axles, for example a first axle, in particular a front axle, and a second axle, in particular a rear axle, of the motor vehicle. An operational connection between the axles of the vehicle is thus established via the connecting axle. The connecting shaft can be designed as a Cardan shaft. It is often desirable to use the multi-axle drive devices by means of the multi-axle drive to perform a multi-axle operation only temporarily, during which time several of the axles are in fact being driven. In the case of the motor vehicle, this is only necessary for example when the traction with one of the drives on one of the axles would be too small, and/or if excessive transverse acceleration occurs. It is therefore frequently more useful to drive only one of the axles by means of a multi-axle drive device.

SUMMARY OF THE DISCLOSURE

The object of the invention is therefore to propose a method for operating a multi-axle drive device, which has advantages over prior art, in particular because it prevents unnecessary switching between the first operating state and the second operating state, as well as vice versa.

This is achieved according to the invention with the method that has the features of claim 1. When the intent is to switch from the second operating state to the first operating state, the synchronization clutch is at least partially opened and the disconnecting clutch is maintained closed, so that when the operations are conducted in a first operating state after that, the disconnecting clutch is opened, and when they are conducted in a second operating state, the synchronization clutch is closed again.

The multi-axle drive device permits to drive selectively only one axle or several axles, in particular all axles. Accordingly, the multi-axle drive device is provided with at least one clutch in order to decouple the second axle from the first axle, or the second output shaft from the first output shaft. In order to keep the moving mass of the multiple-axle drive devices as small as possible and thus to avoid the resulting losses, the connecting shaft should not be operated when not all of the axles are operated, and in particular when only one of the axles is operated. Accordingly, multiple clutches are provided.

Within the context of the multi-axle drive devices presented here, at least the synchronization clutch as well as the disconnecting clutch are provided. The synchronization clutch is provided in an operational connection between the first drive shaft and the connecting shaft. The first output shaft in this case preferably corresponds to one of the axles.

In the case of the motor vehicle, the first output shaft is connected directly, which is to say not via the synchronization clutch and/or the disconnecting clutch, in an operational connection to a drive unit of the motor vehicle. In the operational connection can thus be provided a transmission, preferably a manual transmission, a differential gear, in particular an axle differential gear, and/or a starting clutch. On the other hand, the connecting shaft is connected only indirectly to the drive unit, namely via the synchronization clutch.

The synchronization clutch can have in principle any desired configuration, but preferably it enables a stepless or discrete adjustment of a certain synchronization torque between the first output shaft and the connecting shaft. The disconnecting clutch is particularly preferred to be designed as a form-fitting clutch, in particular a claw clutch, and thus it can be selectively either fully opened or completely closed. Therefore, there are no intermediary positions in which only a part of the torque is transmitted between the connecting shaft and the second output shaft.

The second output shaft can be coupled or is operationally connected via the connecting shaft with the first output shaft. The second output shaft corresponds preferably to the second axle of the motor vehicle or at least to a part thereof. For example, the second output shaft is associated with a wheel of the motor vehicle. The second output shaft can be—similarly to the connecting shaft—connected operationally only indirectly to the drive unit of the motor vehicle, namely via the synchronization clutch and the disconnecting clutch.

In the case of the motor vehicle, there are for example several second output shafts, for instance two, that are assigned to the second output axle. In this case, the connecting shaft is connected on its side facing away from the synchronization clutch to a differential gear, in particular to an axle differential gear, and in this respect it is present as an input shaft for this purpose. A second output shaft is now connected via a disconnecting clutch to both output shafts of the differential gear, wherein on each second output shaft is provided a wheel of the motor vehicle on the side of the disconnecting clutch facing away from the differential gear. As an alternative, it is of course also possible that both second output shaft are connected directly to the differential gear, which is then again connected or can be operationally connected via the disconnecting clutch with the connecting shaft.

The multi-axle drive device can be provided at least in the first operating state and in the second operating state. In the first operating state, both the synchronization clutch and the disconnecting clutch are fully opened, which means that no torque will be transmitted. Accordingly, the connecting shaft is fully decoupled from the first output shaft as well as from the second output shaft, so that it is not driven and it is preferably in the standstill mode. This is preferably also in the case of the embodiment described above which is provided with a differential gear. The connecting shaft and/or the differential gear must not in this case be dragged along, so that the energy that would be uselessly expanded for this in the first operation state is saved. In the second operating state, on the other hand, both the synchronization clutch and the disconnecting clutch are closed, at least partially, preferably completely, so that a torque applied to the first drive shaft is distributed, for example evenly, to the first output shaft and to the second output shaft.

When a changeover from the second operating state to the first operating state is intended, the synchronization clutch must be at least partially operating, and the disconnecting clutch must be kept closed, so that when a first operating state is executed after that, the disconnecting clutch is opened and when a second operating state is realized and the synchronizing clutch will be closed again. Therefore, the switching from the second operating state to the first operating state is at first not carried out completely, but instead, the synchronization clutch should be opened at first only partially, so that the connecting shaft will be again coupled via the disconnecting clutch with the second output shaft.

To this extent, a multi-stage method, in particular a two-stage method is proposed, according to which the amount of the torque of the first output shaft is at first increased with the partial opening of the synchronization clutch and the torque transmitted with the second output shaft is reduced. It is preferred when the synchronization clutch is in the case adjusted in such a way, in particular as needed, that at least a part of the torque is transmitted from the first output shaft to the connecting shaft, for example at least 5%, at least 10%, at least 15%, at least 20%, at least 25%, at least 30%, at least 40%, or at least 45%. Alternatively, the synchronization clutch can be of course also adjusted so that no torque will be transmitted from the first output shaft to the connecting shaft, which means that an operational connection between them is interrupted.

However, it is preferred when the proportion of the torque that is transmitted to the second output shaft or to the connecting shaft is less than 50%, so that the torque applied to the first output shaft is greater than the torque that is applied to the second output shaft. Nevertheless, as was already suggested, the torque transmitted from the first output shaft to the connecting shaft is greater than zero, so that the synchronization clutch is not fully opened. As an alternative, the torque transmitted from the first output shaft to the connecting shaft equals zero.

After that, it is determined whether the first operating state or the second operating state should be carried out. The first operating state or the second operating state is preferably carried out directly after that, for example partially, by opening the synchronization clutch, or after a certain waiting time period, which begins at the point in time of the opening, or immediately afterwards. In the first operating state, the disconnecting clutch is opened. It is preferred when in addition, the synchronization clutch is opened further, in particular fully, if it had not already been the case.

On the other hand, the synchronization clutch is again closed in the second operating state. This is done in particular without first opening the disconnecting clutch, which is to say without opening the disconnecting clutch between the partial opening of the synchronization clutch and its closing. The synchronization clutch is preferably fully closed in the second operating state.

Thanks to such a procedure, or to such a multi-stage procedure when switching from the second operating state to the first operating state, unnecessary switching between the operating states is avoided. Without this procedure, it would only be possible to determine the first operating state after completely switching from the second operating state to the first operating state, so that a satisfactory driving operation is then not possible, for example because there is not a sufficient traction on the ground at the moment without a multi-axle drive. Accordingly, the second operating state must again be switched ever immediately to the second operating state after the change from the second operating state to the first operating state, which on the one hand takes time during which time no propulsion or at least no satisfactory propulsion is available, and/or on the other hand also leads to diminished comfort on the part of the driver of the motor vehicle.

In a preferred embodiment of the invention, the first operating state is carried out when the value of a traction variable or of a driving dynamic variable equals or exceeds a threshold value. As was already indicated above, it is possible to switch fully to the first operating state in the case when there is a sufficient traction by opening the disconnecting clutch to implement the first operating state. Accordingly, the traction variable is determined in particular after at least a partial opening of the synchronization clutch, but before implementing the first operating state or the second operating state.

The traction variable is for example the traction that is determined on the wheels assigned to the first output shaft or arranged thereupon. This means that after the partial operation of the synchronization clutch, the traction of those wheels that are assigned to the first output shaft or operationally connected to it is determined. As a variable of the driving dynamic is used for example acceleration, in particular longitudinal acceleration and/or transverse acceleration.

The traction variable corresponds for example to the traction, or at least it is determined from the traction. For example, the traction variable is the median value of the traction determined for each wheel from the first output shaft. The magnitude of the traction is now compared to the threshold value. If it is equal to or exceeds the threshold value, the first operating state will be implemented. Otherwise, for example the second operating state is carried out, which is to say that the synchronization clutch is closed again, in particular without a prior opening of the disconnecting clutch.

According to a further development of the invention, the second operating state is carried out when the value of the traction variable is less than the threshold value. This procedure has been already mentioned above.

According to another embodiment of the invention, at least one state variable of the motor vehicle is used as a traction variable. In principle any variable that correlates with the actual traction can be applied as a traction variable. Preferable, this is a variable of the state of the motor vehicle.

Particularly preferred is an embodiment of the invention according to which for a traction and/or for state variable is used transverse acceleration, wheel slippage, wheel slippage and/or yaw rate, or the variable of a traction and/or state is calculated from this value or from these values. Each of the above mentioned variables, or several of them, in particular all of these values, provide an indication about the current traction and can therefore be applied individually or in combination as traction variables or as state variables. For example, the traction variable is provided as a function of at least one of the variables, in particular several of the variables, preferably all of the variables. It can be determined from the magnitudes by means of a mathematical formula, a table and/or a characteristics diagram.

A further development of the invention provides that as a traction and/or state variable is used a maximum value of the transverse acceleration, of the wheel slippage and/or of the yaw rate since the last opening disconnecting clutch. In this respect, the history of the magnitude or magnitudes is used, since this provides in particular an indication about the driving mode of the driver of the motor vehicle.

On the basis of the variable, a conclusion can be reached about the probability as to whether an immediate change would be required after switching from the second operating state to the first operating state in the reversed direction. This should be prevented according to the above described embodiment. Therefore, if the maximum value and thus also the probability of an immediate reversal exceeds the maximum value, the second operating state is carried out, otherwise the first operating state is implemented. The maximum value of the variable or the maximum value of the variables are thus to be regarded as reciprocal values of the traction variables.

According to a further embodiment of the invention, a waiting time is inserted after the at least partial opening of the synchronization clutch before one of the operating states is implemented. This was already indicated above. The waiting time serves in particular to enable a safer engagement of the multi-axle drive device. In an ideal case, a stationary or a quasi-stationary state is achieved in this manner, in which the evaluation of the traction variable or variables or the determination thereof can be carried out in a particularly reliable manner.

According to a preferred embodiment of the invention, the waiting time is selected in dependence on at least one traction and/or state variable. For example, the traction variable and/or state variable is determined continuously or in intervals starting from the partial opening of the synchronization clutch, which is to say already before the end of the waiting time period. Accordingly, it can be concluded on the basis of the determined variable whether a reliable decision can be made as to whether the first operating state or the second operating state should be carried out.

Alternatively or in addition, it may be also provided according to the method to wait first for a specific, determined time period and to determine the traction variable and/or state variable only afterwards. It is then determined based on this established variable whether the waiting time should be extended, for example if it is below a certain threshold value.

According to another embodiment, the traction variables and/or the state variable are determined several times, which is to say at certain time intervals. The variable is each time compared to the threshold value. The operating state is implemented only when the value of the variable reaches or exceeds the threshold several times. Otherwise, the synchronization clutch is closed again within the context of the second operating state.

Finally, according to another embodiment of the invention, the waiting time period is ended early, as soon as the value of the traction variable equals or exceeds a second threshold value.

The second threshold value may correspond to the threshold value mentioned above, but it may also be smaller or larger than this value. It is particularly preferred when the second threshold value is higher than the threshold value mentioned above. By ending the waiting time prematurely, the time period between the partial opening of the synchronizing clutch and the implementation of either the first operating state or of the second operating state is significantly reduced. The result of this described procedure is that the switching to the first operating state is already fully implemented as soon as there is a higher probability that a sufficient traction will be available also after this change.

The invention also relates to a multi-axle drive device, in particular for carrying out the method described above, wherein the multi-axle drive device is provided with an operational connection between a first drive shaft and a connecting shaft provided with a synchronization shaft and at least one operational connection between the connecting shaft and a second output shaft provided with a disconnecting clutch, and wherein the synchronization clutch as well as the disconnecting clutch are opened in a first operating state and closed in a second operating state. At the same time, the multi-axle device is designed such that with an intentional change from the second operating state to the first operating state, the synchronization clutch is kept opened, at least partially, and the disconnecting clutch is kept closed, so that the disconnecting clutch will be opened after that when the first operating state is carried out, and the synchronization clutch is closed again when a second operating state is carried out.

The advantages of such a design of a multi-axle drive device have already been mentioned with respect to the corresponding procedure. Both the multi-axle drive device and the method can be further developed according to the embodiments above, so that a reference is made to them in this regard.

The invention is of course also directed at a motor vehicle which is provided with such a multi-axle drive device, wherein the multi-axle drive device can be further developed also in this context according to the embodiments mentioned above.

BRIEF DESCRIPTION OF THE DRAWING

The invention will now be described in more detail based on its embodiments illustrated in the FIGURES, without limiting the invention in this manner. The single FIGURE shows:

FIGURE shows a schematic representation of a drive train of a motor vehicle, which is provided with a multi-axle drive device.

DETAILED DESCRIPTION OF THE DRAWING

The drive train 1 is provided with a multi-axle drive device 2, which is used to selectively operate only one first axle 3, or the first axle 3 as well as a second axle 4. Each of the axles 3 and 4 is equipped in the embodiment illustrated in the FIGURE with two wheels 5, which are arranged on the partial axles 6 and 7 of the first axle 3, and on the partial axles 8 and 9 of the second axle 4. Therefore, the partial axles 6 and 7 of the first axle 3 can thus form a first output shaft 10. However, it is particularly preferred when they are connected via a differential gear, in particular an axle differential gear, to the first output shaft 10, in particular when they are operationally connected to it rigidly and/or permanently. The partial axles 8 and 9 can each be provided as a second output wave 11. Alternatively, the partial axles 8 and 9 can be connected via a differential gear, in particular an axle differential gear, to the second output wave 11.

The multi-axle drive device is provided with a connecting axle 12, by means of which an operational connection can be established between the first axle 3 and the second axle 4. The connecting shaft 12 is provided for example in the form of a Cardan shaft. A synchronization clutch 13 is arranged in an operational connection between the first output shaft 10 and the connecting shaft 12. The synchronization clutch 13 is preferably designed as a force-locking clutch. It enables in particular the transmission of any portion of the applied torque. In an operational connection between the connecting shaft 12 and the second output shaft 11 is additionally arranged a disconnecting clutch 14. In the embodiment illustrated here, two disconnecting clutches are thus provided, wherein each is arranged between a differential gear 15 and one of the both output shafts 11, or the partial axles 8 and 9.

The connecting shaft 12 is in this case operationally connected rigidly and/or permanently with the differential gear 15. The operational connection between the differential gear 15 and the connecting shaft 12 on the one hand, and the second output shaft 11 in the form of the partial axles 8 and 9 on the other hand can be selectively established or interrupted by means of disconnecting clutch 14. The disconnecting clutches are preferably in the same position, so that either an operational connection is established or interrupted between the connecting shaft 12 on the one hand, and the partial axles 8 and 9 on the other hand.

In a first operating state of the multi-drive device 2, the synchronization clutch 13 and the disconnecting clutch 14 are opened, so that the operational connection between the first output drive 10 and the second output drive 11 is interrupted. Therefore, to the extent that a disconnecting clutch 14 or a second output shat 11 are discussed hereinafter, both output shafts 11 or both disconnecting clutches 14 are meant by this within the context of the present embodiment. In a second operating state, the synchronizing clutch 13 and the disconnecting clutch 14 are fully closed. The disconnecting clutch 14 is preferably designed as a form-fitting clutch, in particular as a claw clutch.

Moreover, with an intended switching from the second operating state to the first operating state, the synchronization clutch 13 is at least partially opened and the disconnecting clutch 14 is maintained closed. It is preferred when the synchronization clutch is opened only partially so that the torque is transmitted between the first output shaft 10 and the connecting shaft 12 or the second output shaft 11. At the same time, the disconnecting clutch 14 remains closed. A traction variable is then determined and compared to a threshold value. If the traction variable exceeds or corresponds to the threshold value, the first operating state is carried out. Otherwise, the second operating a second operating mode is carried out.

In the first operating mode, the disconnecting clutch 14 is open. At the same time, it is preferred when the synchronization clutch 13 is also open, in particular fully. In the second operating mode, however, the synchronization clutch should be closed, without opening first the disconnecting clutch 14. Accordingly, in the first operating mode, the intended change from the second operating state to the to the first operating state is carried out, while it is interrupted with the second operating mode. With the method according to the invention, it is therefore possible to avoid an unnecessary switching back and forth between the operating states, while it is determined already after a partial opening of the synchronization clutch 13 whether the changeover to the first operating state will be fully carried out, or whether it will be instead interrupted.

The invention claimed is:

1. A method for operating a multi-axle drive device, the multi-axle drive device having a synchronization clutch arranged in an operational connection between a first output shaft and a connecting shaft, a disconnecting clutch arranged in an operational connection between the connecting shaft and a second output shaft, wherein each of the synchronization clutch and the disconnecting clutch is configured to be open in a first operating state and closed in a second operating state, the method comprises:
   opening the synchronization clutch at least partially so that an amount of torque of the first output shaft is increased and a torque transmitted with the second output shaft is reduced, and maintaining the disconnecting clutch in a closed state during an intended switching from the second operating state to the first operating state;
   conducting one operation mode selected from a first operation mode and a second operation mode, wherein in the first operation mode the disconnecting clutch is opened and in the second operation mode the synchronization clutch is closed,
   wherein the first operation mode is selected if a value of at least one of a traction variable or a variable of driving dynamics is equal to or greater than a threshold value and the second operation mode is selected if the value of the traction variable or the variable of driving dynamics is less than the threshold value.

2. The method according to claim 1, wherein the traction variable is a state variable of a motor vehicle.

3. The method according to claim 2, wherein the first operation mode and the second operation mode are conducted based on the state variable, which is calculated as a function of a transverse acceleration value, a wheel slippage value, and a yaw rate.

4. The method according to claim 2, wherein the first operation mode and the second operation mode are conducted based on the state variable, which is a maximum value, since a last opening of the disconnecting clutch, of one of transfer acceleration, wheel slippage rate, and yaw rate.

5. The method according to claim 2, further comprising, after the step of opening the synchronization clutch at least partially, waiting for a waiting time period before conducting the first operation mode or the second operation mode.

6. The method according to claim 5, wherein a length of the waiting time period is derived from at least one of the traction variable, the variable of driving dynamics, and the state variable.

7. The method according to claim 1, wherein the method further comprises waiting for a waiting time period, and further comprises prematurely terminating the waiting time period when the value of the traction variable or the variable of driving dynamics is equal to or greater than the threshold value.

8. A multi-axle drive device, comprising:
   a synchronization clutch arranged in an operational connection between a first output shaft and a connecting shaft;
   a disconnecting clutch arranged in an operational connection between the connecting shaft and a second output shaft;
   wherein each of the synchronization clutch and the disconnecting clutch is configured to be open in a first operating state and closed in a second operating state;
   wherein the multi-axle drive device is configured to, during an intended switching from the second operating state to the first operating state, open the synchronization clutch at least partially so that an amount of torque of the first output shaft is increased and a torque transmitted with the second output shaft is reduced, and maintain the disconnecting clutch in a closed state;
   wherein the multi-axle drive device is configured to, when a first operation mode is initiated, open the disconnecting clutch;
   wherein the multi-axle drive device is configured to, when a second operation mode is initiated, close the synchronization clutch, and
   wherein one operation mode selected from the first operation mode and the second operation mode, and the first operation mode is selected if a value of at least one of a traction variable or a variable of driving dynamics is equal to or greater than a threshold value and the second operation mode is selected if the value of the traction variable or the variable of driving dynamics is less than the threshold value.

9. The multi-axle drive device according to claim 8, wherein the traction variable is a state variable of a motor vehicle.

10. The multi-axle drive device according to claim 9, wherein the multi-axle drive device is configured to perform the first and second operation modes based on the state variable, which is calculated as a function of a transverse acceleration value, a wheel slippage value, and a yaw rate.

11. The multi-axle drive device according to claim 9, wherein the multi-axle drive device is configured to perform the first and second operation modes based on the state variable, which is a maximum value, since a last opening of the disconnecting clutch, of one of transfer acceleration, wheel slippage rate, and yaw rate.

12. The multi-axle drive device according to claim 9, wherein the multi-axle drive device is further configured to, after opening the synchronization clutch at least partially, wait for a waiting time period before conducting the first operation mode or the second operation mode.

13. The multi-axle drive device according to claim 12, wherein a length of the waiting time period is derived from at least one of the traction variable, the variable of driving dynamics, and the state variable.

14. The multi-axle drive device according to claim 8, wherein the multi-axle drive device is configured to wait for a waiting time period, and wherein the multi-axle drive device is further configured to prematurely terminate the waiting time period when the value of the traction variable or the variable of driving dynamics is equal to or greater than a second threshold value.

* * * * *